US010839098B2

(12) United States Patent
Borup et al.

(10) Patent No.: US 10,839,098 B2
(45) Date of Patent: Nov. 17, 2020

(54) SYSTEM TO PREVENT EXPORT OF SENSITIVE DATA

(71) Applicant: INTERNATIONAL BUSINESS MACHINES CORPORATION, Armonk, NY (US)

(72) Inventors: Jorgen Emil Borup, Brondby (DK); Marco Aurelio Stelmar Netto, Cubatao (BR); Thiago Cesar Rotta, Campinas (BR); Sergio Varga, Campinas (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 173 days.

(21) Appl. No.: 15/481,833

(22) Filed: Apr. 7, 2017

(65) Prior Publication Data
US 2018/0293400 A1 Oct. 11, 2018

(51) Int. Cl.
*G06N 20/00* (2019.01)
*G06F 21/55* (2013.01)
(Continued)

(52) U.S. Cl.
CPC ........ *G06F 21/6245* (2013.01); *G06F 21/554* (2013.01); *G06N 20/00* (2019.01); *H04L 51/12* (2013.01); *H04L 63/0263* (2013.01); *H04L 67/06* (2013.01); *H04L 51/22* (2013.01); *H04L 63/1408* (2013.01); *H04L 67/22* (2013.01)

(58) Field of Classification Search
CPC .... G06F 21/00; G06F 21/6245; G06F 99/005; G06F 21/55–556; G06Q 10/107; G06N 20/00; G06N 20/10; G06N 20/20; H04L 47/00; H04L 47/20; H04L 67/00; H04L 67/06; H04L 67/20; H04L 51/22; H04L 63/14–1433; H04L 67/22; H04L 67/0227; H04L 67/0245; H04L 67/0263; A61B 5/16; A61B 5/163–165
See application file for complete search history.

(56) References Cited

U.S. PATENT DOCUMENTS

| | | | |
|---|---|---|---|
| 7,681,032 B2 * | 3/2010 | Peled | H04L 63/0245 713/154 |
| 2005/0065823 A1 | 3/2005 | Ramraj et al. | |

(Continued)

FOREIGN PATENT DOCUMENTS

| | | |
|---|---|---|
| WO | 2004047398 | 6/2004 |
| WO | 2006069866 | 7/2006 |

*Primary Examiner* — Daniel B Potratz
*Assistant Examiner* — D'Arcy Winston Straub
(74) *Attorney, Agent, or Firm* — F. Chau & Associates, LLC (57) ABSTRACT

A router system includes a router, a memory storing a client program, and a processor configured to execute the client program. The client program is configured to enable a user to transfer a file from a source to a destination, determine whether data within the file includes sensitive information, determine a probability that transmission of the data from the source to the destination would violate a policy, send normal data packets to the router based on the file, and send a stop data packet to the router when the probability exceeds a threshold. The router forwards the normal data packets to the destination until the router receives the stop data packet.

10 Claims, 5 Drawing Sheets

(51) Int. Cl.
G06F 21/62 (2013.01)
H04L 29/08 (2006.01)
H04L 29/06 (2006.01)
H04L 12/58 (2006.01)

(56) References Cited

U.S. PATENT DOCUMENTS

| | | | |
|---|---|---|---|
| 2010/0057720 A1* | 3/2010 | Kalyan | G06F 16/337 |
| | | | 707/E17.017 |
| 2012/0005720 A1 | 1/2012 | McGloin et al. | |
| 2012/0110680 A1 | 5/2012 | Oliver et al. | |
| 2012/0290292 A1 | 11/2012 | Liu et al. | |
| 2013/0167192 A1* | 6/2013 | Hickman | G06F 21/60 |
| | | | 726/1 |
| 2014/0053238 A1* | 2/2014 | Brannon | H04L 9/3231 |
| | | | 726/1 |
| 2014/0115712 A1 | 4/2014 | Powell et al. | |
| 2014/0289875 A1 | 9/2014 | Knafel | |
| 2016/0057115 A1 | 2/2016 | Abuelsaad et al. | |
| 2016/0127417 A1* | 5/2016 | Janssen | H04L 63/1433 |
| | | | 726/1 |
| 2016/0301707 A1* | 10/2016 | Cheng | H04L 43/12 |
| 2017/0041264 A1* | 2/2017 | Khomami Abadi | |
| | | | H04W 12/0808 |
| 2017/0177884 A1* | 6/2017 | Mehta | A61B 5/117 |

* cited by examiner

SYSTEM TO PREVENT EXPORT OF SENSITIVE DATA

BACKGROUND

1. Technical Field

The present disclosure relates generally to a system to prevent the export of sensitive data, and more particularly to a router capable of preventing the export of the sensitive data.

2. Discussion of Related Art

Data privacy is one of the issues that concern most information technology (IT) organizations. Several countries and organizations have some data privacy requirements due to a contract or country regulations and laws. With the globalized economy, more and more organizations are deploying data out of their boundaries due to cost restrictions. Due to this, it is important to know the source location of the data, the destination location where the data is to be hosted, and whether export of the data from the source location to the destination location is likely break a law or regulation of either the source or destination location.

However, since identifying the types of data that can break the law or violate a contract is a difficult task, the data can be very large, and the data can be arranged into so many different structured and unstructured data formats, it can be difficult to prevent the export of sensitive data.

A router is a networking device that forwards data packets between computer networks. However, since a conventional router is unable to determine whether the data in the packets it is about to forward includes sensitive data, it may unknowingly violate a law or regulation.

Thus, there is a need for methods and systems that can prevent the export of sensitive data.

BRIEF SUMMARY

A router system according to an exemplary embodiment of the inventive concept is provided. The router system includes a router, a memory storing a client program, and a processor configured to execute the client program. The client program is configured to enable a user to transfer a file from a source to a destination, determine whether data within the file includes sensitive information, determine a probability that transmission of the data from the source to the destination would violate a policy, send normal data packets to the router based on the file, and send a stop data packet to the router when the probability exceeds a threshold. The router forwards the normal data packets to the destination until the router receives the stop data packet.

A computer-implemented method according to an exemplary embodiment of the inventive concept is provided for controlling the transmission of a file. The method includes: displaying, by a client program, a user interface that enables a user to identify a file to transmit to a destination; determining, by the client program, whether data within the file includes sensitive information; determining, by the client program, a source of the file; determining, by the client program, a probability that transmission of the data from the source to the destination would violate a policy; and sending, by the client program, the file to the destination only when the probability exceeds a threshold.

A computer program product according to an exemplary embodiment of the inventive concept is provided for controlling the transmission of a file. The computer program product includes a computer readable storage medium having program instructions embodied therewith. The program instructions are executable by a processor to perform a method including: displaying a user interface that enables a user to identify a file to transmit to a destination; determining whether data within the file includes sensitive information; determining a source of the file; determining a probability that transmission of the data from the source to the destination would violate a policy; and sending, by the client program, the file to the destination only when the probability exceeds a threshold.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION OF THE EXEMPLARY EMBODIMENTS

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

Figure 1:
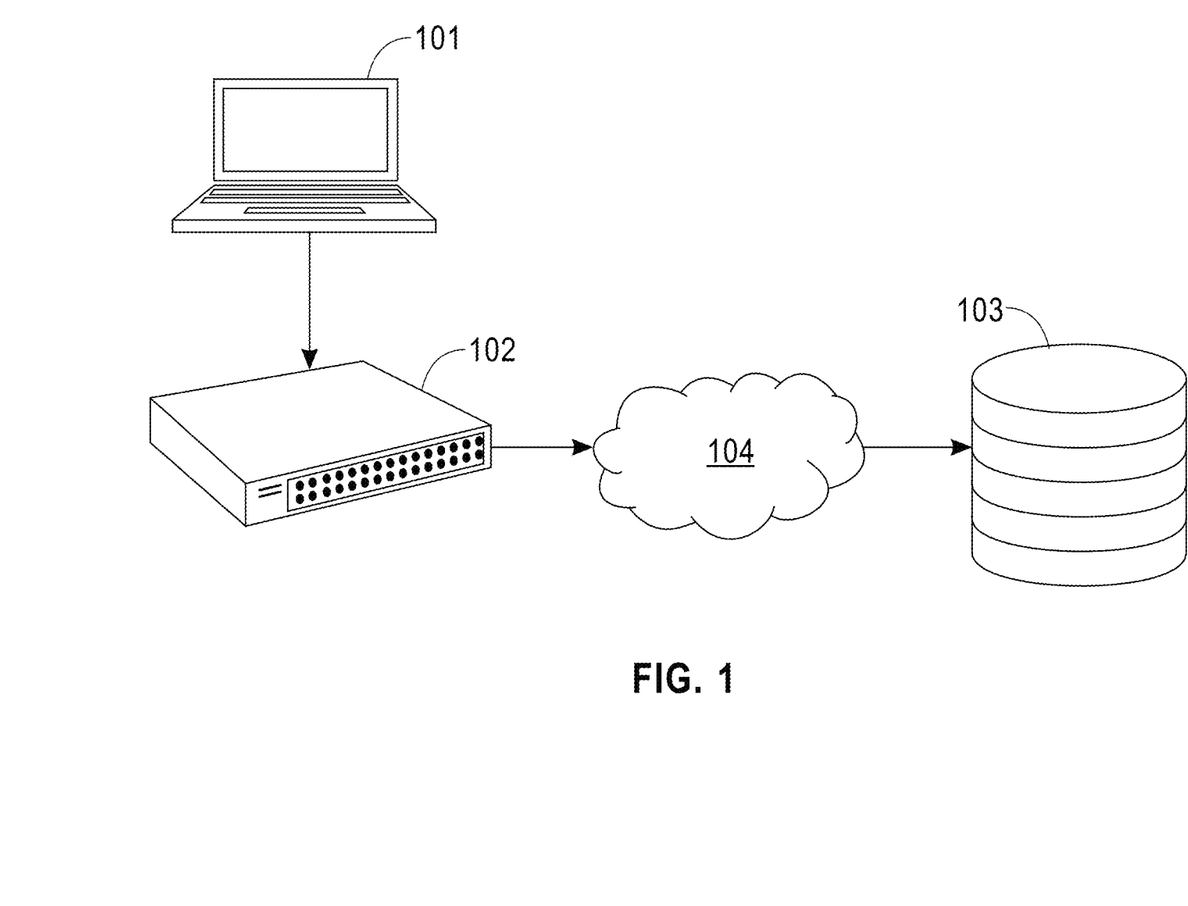
FIG. 1 shows a system for protecting the routing of sensitive data according to a exemplary embodiment of the inventive concept.

FIG. 1 illustrates a system according to an exemplary embodiment of the inventive concept that may be used to prevent the export of sensitive data according to an exemplary embodiment of the inventive concept.

The system includes a computer 101, a router 102, and a remote server 103. The router 102 forwards data packers from the computer 101 through the internet 104 to the server 103. The computer 101 includes a client program that analyzes a file that a user has requested be transmitted across the internet 104, the source of the file, and the destination the file is to be transmitted (e.g., the server 103), to determine whether transmission of the file is likely to violate a certain policy.

In an embodiment, the policy is a rule in a contract associated with the management of data included within the file. For example, the rule could indicate that social security numbers of users are never to be transmitted to certain countries. In an embodiment, the policy is an export law that indicates data associated with a certain technology is never to be transmitted to certain countries. In an embodiment, the policy relates to a company or government policy on the transmission of sensitive data. For example, the policy could indicate that data deemed as classified or confidential is never to be transmitted.

In an embodiment, the client program is an e-mail client or a file transfer protocol (FTP) client. For example, a user invokes the e-mail client, uses a graphical user interface (GUI) of the e-mail client to attach a file, and enter one or more destination email addresses. Typically the file would be transmitted to the destination email address as soon as the user selects a send button on the GUI. However, the e-mail client according to an exemplary embodiment of the inventive concept first analyzes the file and the destination email address(es) to determine whether transmission of the file is likely to violate a policy. If the e-mail client determines the transmission is likely to violate the policy, the e-mail client can advise the user not to send the file. For example, the e-mail client may present a text message or a graphic on a display of the computer 101 informing the user that the file should not be sent or cannot be sent. The e-mail client may provide the user with additional information such as the reason why the file cannot be sent. For example, the e-mail client could inform the user that the transmission of the file would violate a company policy, a particular export law, or a particular contract.

In an embodiment, the e-mail client sends a message (e.g., a text, an email, etc.) to a supervisor notifying them that there was an attempt to send sensitive data and identifying the user that attempted to send the data.

In another embodiment, the client program is a file transfer protocol (FTP) client. For example, a user invokes the FTP client using a GUI of the client or a command prompt, enters a destination internet protocol (IP) address, and identifies the file to transmit to the destination IP address. A conventional FTP client establishes a connection to the destination IP address and transmits the file as soon as the user enters the proper transmit command or selects the appropriate GUI button. However, the FTP client according to an embodiment of the invention, prior to establishing the connection, informs the user that the file cannot be sent if the transmission of the file to the destination address is likely to violate a policy. Similar to the e-mail client, the FTP client may provide the user with additional information such as the reason why the file could not be transmitted and/or notify a supervisor of the attempt.

In a further embodiment, the transferring program (e.g., the e-mail of FTP client) places the file into a buffer along with destination information identifying the destination (e.g., the destination e-mail address or IP address) and does not send the file until it receives a notification from a checking program indicating it is safe to send the file. The checking program can be run in the background, and periodically analyze the file and the destination information in the buffer to determine whether transmission of the file to a destination in the destination information is likely to violate a policy. If the checking program determines that the file is likely to violate the policy, the checking program sends a message to the corresponding transferring program (e.g., the e-mail or FTP client) indicating that the file cannot be transmitted. In response to the message, the transferring program can cancel the scheduled transmission and notify the user or a supervisor that the file could not be sent.

Figure 2:
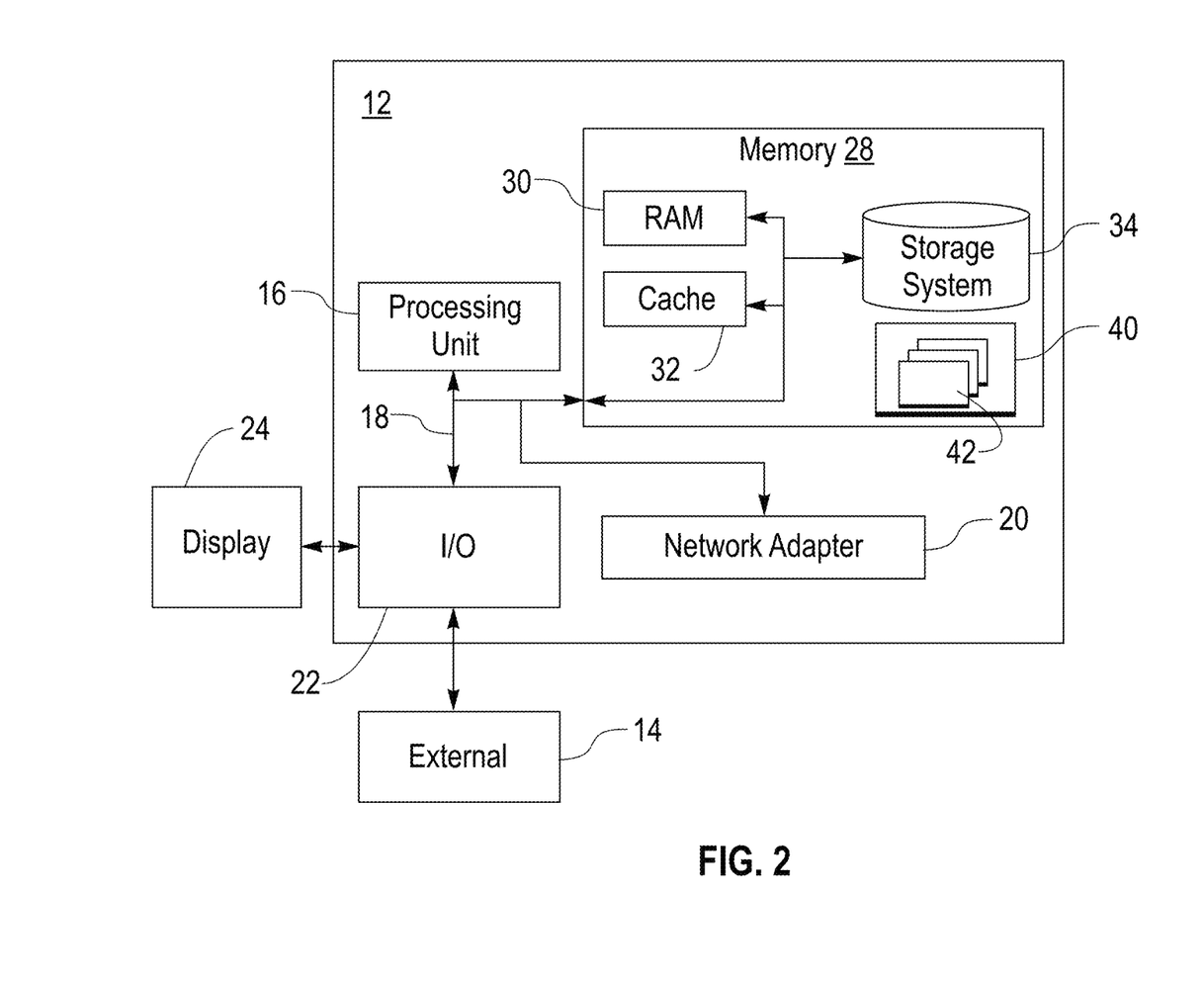
FIG. 2 shows an exemplary computer that may be used to implement on or more components of the system.

FIG. 2 illustrates a computer system/server that may be used to implement the computer 101 of FIG. 1. The computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16. The system memory 28 may store one or more of the above described clients for execution by the processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

In an exemplary embodiment, the determination of whether transmission of a file to a destination email address or IP address is likely to violate a policy is performed by the router 102. In this, embodiment, the router 102 analyzes the data within the payload of one or more IP packets, and the destination IP address in the headers of these IP packets to determine whether one or more of these packets contain data that would violate the policy if sent to the destination IP address. If an embodiment, if the router 102 determines that a violation will occur if one of the packets is sent, the router 102 deletes the packet, and notifies a supervisor of the attempt.

In a further embodiment, the determination of whether transmission of a file to a destination email address or an IP address is likely to violate a policy is performed by a client (e.g., an e-mail or FTP client) of the computer 101 and the client sends a stop data packet 202 to the router 102 when it determines that the policy has been violated. In this embodiment, the client is indirectly preventing the transmission by notifying the router 102 of the occurrence so that the router 102 can take preventive action if it so desires.

Figure 3:
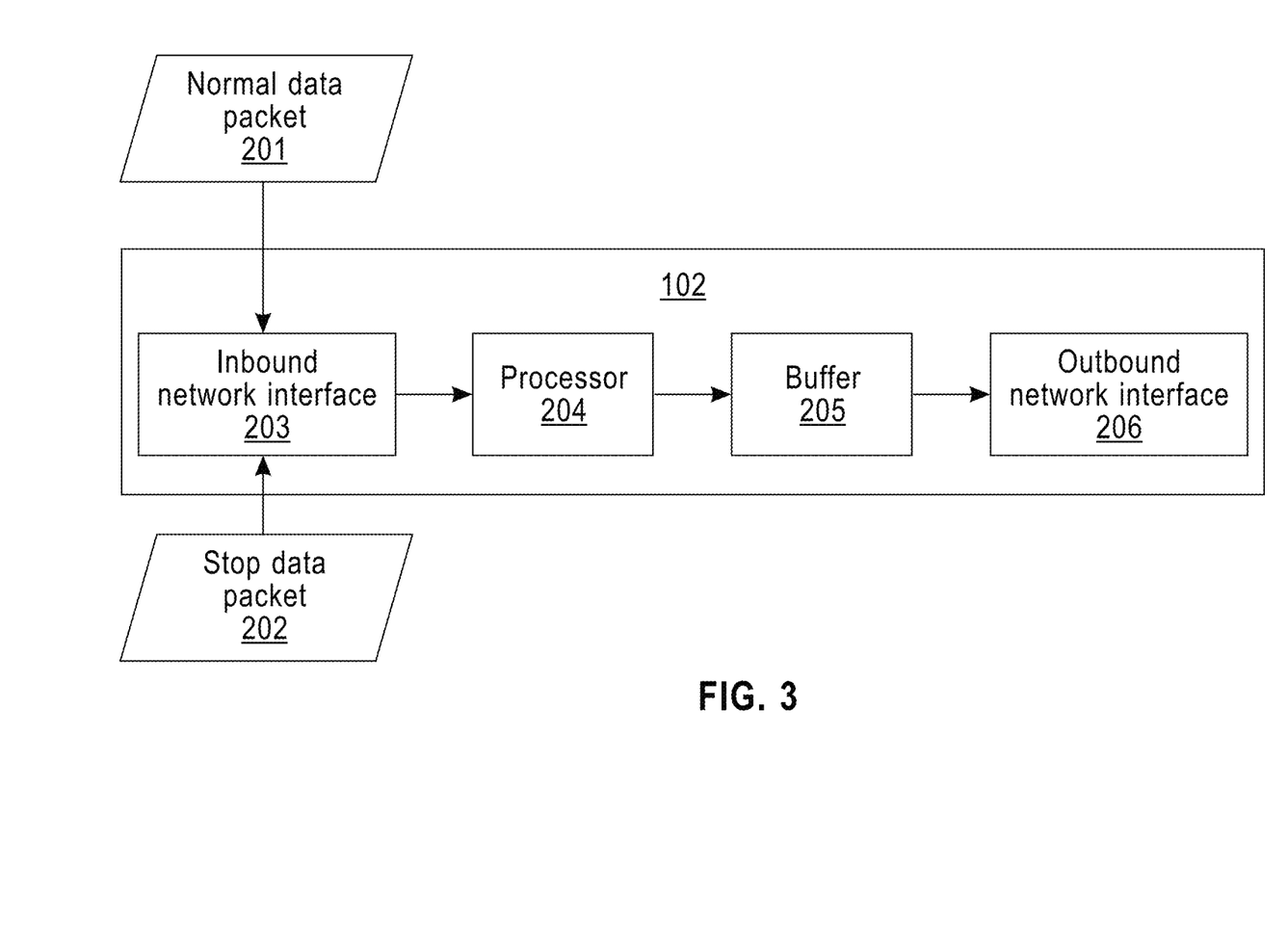
FIG. 3 shows a router according to an exemplary embodiment of the inventive concept that may be used in the system.

FIG. 3 shows an embodiment of the router. The router 102 includes an inbound network interface 203, a processor 204, a buffer 205, and an outbound network interface 206. Packets are received at the inbound network interface 203, processed by the processor 204, and the processed packets are stored in the buffer 205. The processed packets may then be forwarded through an internal connection unit to the outbound network interface 206, which transmits them on the next hop of the journey to their final destination. If the processor 204 receives a normal data packet 201, it sends it to the buffer 205 or directly to the outbound network interface when the buffer 205 is omitted. However, if the processor 204 receives the stop data packet 202, in an embodiment of the invention, the processor 204 deactivates the ability of the router 102 to transmit data for a period of time. For example, the processor 204 could deactivate the outbound network interface 206 to prevent transmission of data. In another embodiment of the inventive concept, the processor 204 deletes the data stored in the buffer 205 when it receives a stop data packet 202. The stop data packet 202 is similar to a normal data packet 201, but includes additional information in its header that enables the router 102 to distinguish it from a normal data packet 201. For example, the header may include a field indicating that the data packet it to be treated as the stop data packet 202.

Embodiments of the invention may use a computer program that is configured to analyze unstructured data within a file is that is about to be transmitted. Prior to the analysis, the program may consume data privacy laws and contract regulations and compile the information into a computer readable format that can be processed by an inference engine that will receive information about the dataset to be verified along with additional information provided by a user. The program may also output a report containing the results of the analysis.

Figure 4:
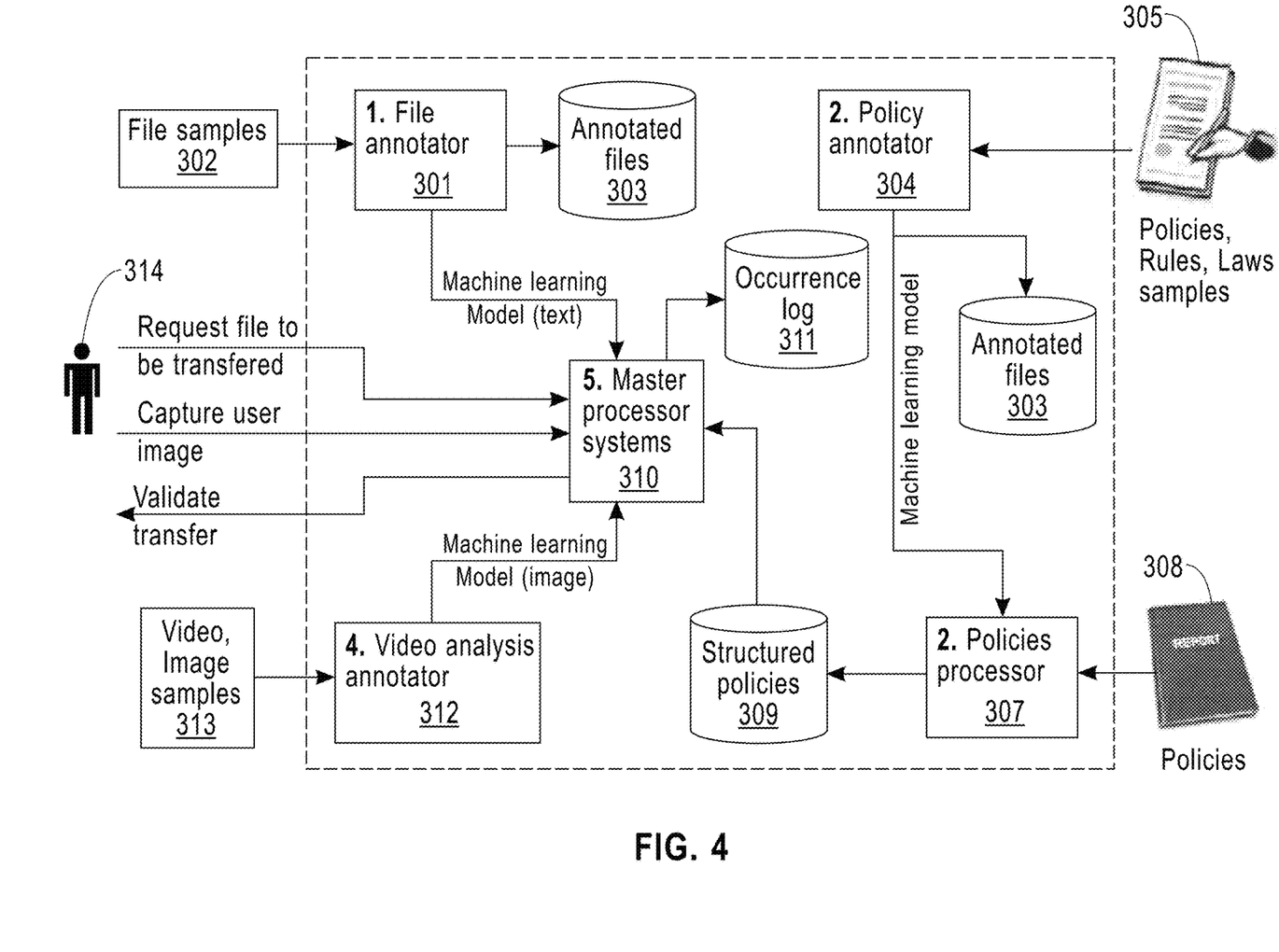
FIG. 4 shows a client program according to an exemplary embodiment of the invention that may be used in the system.

FIG. 4 illustrates a method to prevent export of sensitive information according to an exemplary embodiment the invention. A user 314 (e.g., a subject matter export) uses the file annotator 301 to annotate documents 302 with one or more provided labels. For example, the file annotator 301 may present a GUI to the user 314 with a drop selectable list of these labels. The labels could be high level such as "sensitive data", "non-sensitive data", "classified data", "confidential data", "personal data", "sensitive technology" or more low level such as "passport data", "social security number data", "mailing address data", "account number data", "email address data", "phone number data", "password data", "logon data", etc. For example, the user 314 could use a mouse to select a first section of text of the document that corresponds to a particularly sensitive technology and select a label corresponding to the technology (e.g., "sensitive technology"), and select a second different section of text the same document or a different document that corresponds to personal data and select the label that identifies the section as personal data (e.g., "personal data").

The resulting annotated documents maybe stored in an annotated files database 303. For example, the database 303 may include an entry identifying a given annotated file, identifying the text that was annotated (e.g., using character positions or line numbers) in the given annotated file, and the label that was applied (e.g., an index of the label).

For annotating documents, the user 314 (e.g., a subject matter expert) does not need to annotate every single document. The user 314 needs only to use a set of relevant documents as a sample set (e.g., a training data set) that will give a machine learning model a level of accuracy to identify all the important elements described even in the documents that were never used as part of the dataset to train the model. As new relevant documents are created, where eventually new elements never seen before need to be identified, the user 314 can retrain the model and publish it to the master processor 310.

In an embodiment, the file annotator 301 includes a classifier that is trained using the annotated files, and the classifier is provided to the master processor 310 so it can later use the classifier on a new input file to determine whether the input file should be classified according to one or more of the labels using in the annotating. For example, if the user 314 annotated several different sections as including references to a certain sensitive technology and the new input document contains similar data sections, the master processor 310 would classify the new input document as also referencing the same sensitive technology.

The policy annotator 304 enables the user 314 to annotate policy documents 305 where policy documents are described which allow or do not allow information exchange between sources and destinations. Sources and destinations can be any type of organization, location, country, or logical locations (e.g., network addresses) that policies may be applied given the local laws where the data resides or is intended to be transferred to. The policy documents 305 are mostly found as unstructured information in the form of text. The policy annotator 304 provides a user interface for the user 314 to annotate unstructured domain literature, and use those annotations to create a custom machine-learning model that understands the language of the domain (i.e., the policies).

In an embodiment, the user 314 annotates all rules in a policy that relate to one or more of the labels used to annotate the documents 302. For example, if the user 314 annotated a section of a document as referencing a particular technology, the user 314 could annotate a section of a policy document that indicates the particular technology is not to be exported to countries A, B, and C. For example, if the user 314 annotated a section of a document as including personal data (e.g., social security numbers, addresses, etc.), the user 314 could annotate a section of a policy document that indicates personal data is not to be transmitted anywhere except the listed countries. For example, if the user 314 annotated a section of a policy document as including classified data, the user 314 could annotate a section of a policy document indicating that classified files are not to be transmitted anywhere except the listed government entities.

The intent of the policy annotator 304 is to identify which elements are the subject of penalties if they are digitally transferred from a given source to a destination. Once a machine learning model is created, the policy annotator 304 also populates a relational database identified as Annotated policies 306, which is historical data of the data used to train the machine learning model. The machine learning model is then published to the policies processor 307. For example, the machine learning model may be a classifier that was trained on the annotated policies. The annotated policies database 306 is composed of annotated policy documents that were used to create the machine learning model. It can also be considered as a ground truth for policies which represent entity types, relation types between entity mentions, and co-references of entity types.

The policies processor 307 applies the machine learning model generated by the annotated documents to statistically parse unknown policy documents 308 to generate structured data and populate a relational knowledge database 309 based on predefined schema that was defined as important portions/elements of the unstructured data that need to be considered further in the process to allow or deny an action based on the policies. In the policies processor 307, a plurality of documents in natural language are analyzed to find elements to construct the predefined knowledge database 309 with the rules of what type of data can and cannot be transferred from a given source to a destination. Elements such as passport IDs, names, and addresses can be subjects of what can or cannot be transferred, and are assumptions of elements that are mentioned in policy documents. The database 309 holds the entities or elements that are an important part of what policy documents mention about data or information that can or cannot be digitally transferred. The database 309 can be accessed by a variety of means and may also be updated manually in case of minor changes on policies in which the documents have not been processed. Further, the database 309 can be created with joint efforts with governments to enforce cyber security.

The video analysis annotator 312 is optional and works similar to the file annotator 301 and the policy annotator 304. The video analysis annotator 312 uses still images and moving images 313 (e.g., videos) as a source of data that will be annotated to generate a machine learning model. The video analysis annotator 312 is configured to identify faces in the images and annotate the expression of the person with a label that indicates the emotion of the person (e.g., happy, sad, fearful, frustrated, nervous, etc.). A face model is created by the video analysis annotator 312 and it is used by the master processor 312 to analyze the face of the person that's transferring a document, if the person is using a manual method such as a FTP or e-mail. The video analysis annotator 312 may store the annotated faces in a database. The database may store a group (cluster) of related faces together in the database. For example, a cluster may include faces that have all been classified as having the same expression or emotion. The database can be considered as a ground truth for detecting the emotion of the person transferring a file via the FTP or e-mail.

In an embodiment, when the user 314 is initiating a data transfer using a file transfer client (e.g., an FTP or e-mail client), the master processor 310 turns on a camera of the computer 101, to start capturing the face of the user. The goal is to capture the user's body language, specifically from his/her face that matches to body language indicating how nervous the user is feeling at the time when they are executing a suspicious file transfer.

The master processor 310 uses the machine learning models that were created by the other components. The master processor 310 performs a deep analysis of the file to be transferred using the machine learning models. In an embodiment, the master processor 310 tokenizes text of the file into textual tokens according to the machine learning models and a rule parser, to statistically determine and extract all the named-entities found throughout the file. Once all the named-entities are extracted, the master processor 310 determines the source from where the file is to be sent from and the destination to which the file is to be sent. Then, each of the extracted named-entity types are compared to the policies in the policy database 309 where all the named-entity types are described together with other rules of what can or cannot be transferred to a given location. In an embodiment, if the user 314 looks suspicious and there are entities in the file to be transferred that are not allowed to be transferred per the policy documents, the user 314 may be notified and a record of the occurrence is created and stored in an occurrence log 311.

In an embodiment where the master processor 310 is part of the e-mail client or the FTP client, the master processor 310 can cancel the file transfer when it determines that the transfer is not allowed. In an embodiment where the master processor 310 is external to the e-mail client or the FTP client, the master processor 310 can send a stop data packet 202 to the router 102 configured to interpret the stop data packet 202 to prevent output of data. In another embodiment where the master processor 310 is external to the transferring program (e.g., the e-mail or FTP client), the transferring program does not complete the transfer until it receives a message from the master processor 310 indicating it is safe to complete the transfer. If there is no matching between named-entity types and policies, the transfer may continue its process for completion.

In an embodiment where images are not available or the video analysis annotator 312 is omitted, the master processor 310 only considers whether the file being transferred will violate one of the policies. For example, if the file to transfer violates a policy, the transfer is not permitted, and if the file to transfer does not violate the policy, then the transfer is permitted.

In a further embodiment, the master processor 310 determines from the machine learning models and the file to be transferred, a probability of how likely the file is to violate a given rule of the policy database 309. If the probability exceeds a pre-defined threshold, then transfer of the file is permitted, and otherwise transfer of the file is prevented. In an embodiment, the master processor 310 can further adjust the probability using the image machine learning model output from the video analysis annotator 312. For example, if the probability is below the pre-defined threshold, and the master processor 310 determines that the user 314 has auspicious body language, the probability is increased by a pre-defined increment amount, which may vary based on the severity of the body language. If the adjustment to the probability is enough to bring it above the pre-defined threshold, then the transfer of the file is not permitted.

In a further embodiment, a physical or physiological sensor is present that provides physiological sensor data (e.g., pupil dilatation and/or heart rate) to the master processor 310, which can uses this sensor data to determine whether the user 314 is considered suspicious when attempting to transfer the file. The master processor 310 can increase the probability with another pre-defined increment when the heart rate exceeds a pre-defined rate or the diameter or radius of the pupil of the user 314 exceeds a pre-defined distance.

Figure 5:
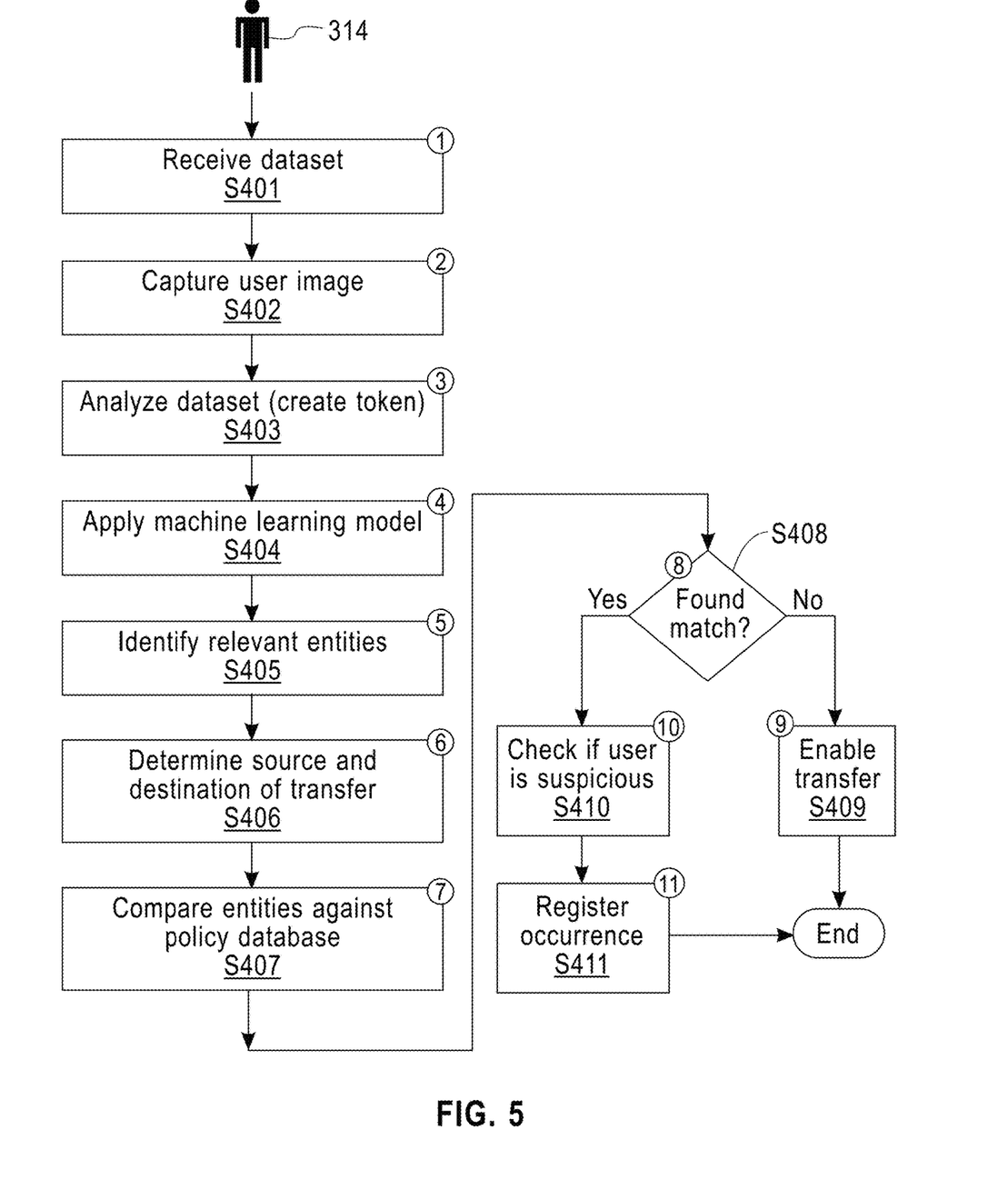
FIG. 5 shows a method according to an exemplary embodiment of the invention that may be used in the system.

FIG. 5 illustrates a method of preventing export of sensitive data according to an exemplary embodiment of the invention. The method presumes that the various above-described machine learning models have already been created previously.

The method includes receiving a dataset (S401). For example, the dataset may be one or more files that a user is about to transfer to an external site or user. When the method is embedded within an e-mail client, the client receives the file when the user attaches the file using an interface of the e-mail client. When the method is embedded within an FTP client, the client receives the file after the user enters an FTP command identifying the file and a destination IP address. When the method is implemented outside the transferring client, the method may be part of a process that is running in the background that receives the file from a temporary buffer to which the transferring client has stored the file.

The method includes capturing an image of the user that has requested the file transfer (S402). For example, the camera of a computer being used to initiate the transfer can be triggered to capture a photo. The step of capturing the image is optional, may be omitted, or may be replaced with another step of capturing sensor data (e.g., heart rate, pulse dilation data), or supplemented with the sensor data.

The method next includes analyzing the received dataset (S403). The analysis may include extracting tokens of text from each of the files of the dataset. The tokens may be stored so that first tokens of a first file among the files are identifiable from second tokens of a second file among the files.

The method next includes applying a machine learning model to the extracted tokens of each file to determine whether any of the files includes sensitive data (S404).

If one of the files has been determined to include sensitive data, the method next includes identifying relevant entities among the extracted tokens of the one file (S405).

The method next includes determining the source and destination for the transfer (S406). The source location of the transfer may be determined by accessing global positioning satellite (GPS) data of the computer 101 or a configuration file that indicates the source location. The country of the source location may be determined by comparing the source location to pre-defined boundary locations of various countries or by accessing various online tools. The dataset may be received with additional information that indicates the destination of the transfer. The additional information may indicate a destination IP address or a destination email address. The physical location of the destination IP address destination may be determined by accessing an online listing that provides the physical address of an internet service provider that manages a website corresponding to the destination IP address. The location of the destination email address may be determined by extracting the IP address in the e-mail header section and then looking up the physical location of the extracted IP address.

The method further includes comparing the relevant entities against the policies in the database (S407). The comparing may consider the determined source and destination location.

Then the method determines if any results of the comparing resulted in a match (S408). A match results when one of the policies indicates one of the entities (e.g., the social security data) is not to be transmitted from the source location to the destination location.

If there is no match, the method enables transfer of the file (S409). For example, if the method is part of an e-mail client, then the e-mail client e-mails the file to the destination. For example, if the method is part of an FTP client, then the FTP-client FTPs the file to the destination. For example, if the method is being performed by router 102, then the router 102 forwards packets associated with the file to the destination.

If there is a match, then the method determines based on the captured image whether the user is considered to be suspicious (S410). The determination of whether the user is suspicious may instead be performed based on sensor data such as heart rate or pupil dilation data, or the determination may be performed based on both the image and the sensor data. If the user is determined to be suspicious, an occurrence of the attempt to transmit the file is registered or recorded (S411). In addition to the recording, the system may prevent the transmission of the file. For example, the transferring program (e.g., the e-mail client or the FTP client) does not complete the transaction.

In another embodiment when there is a match, the system sends a message or a special packet (e.g., stop data packet 202) to the router 102 to prevent the router 102 from forwarding any packets for a period of time. The system may notify a supervisor of the stoppage through a graphical popup, an e-mail, or a text message. The supervisor could then respond to the popup, e-mail, or the text with a response that informs the system to send a start data packet to the router 102. In this embodiment, the router 102 is configured to restart forwarding of packets upon receiving the start data packet. The start data packet may include a field in its header that enables the router 102 to distinguish between a normal data packet 201, a stop data packet 202, and start data packet.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A router system comprising:
a router comprising a buffer; and
a computer comprising a memory and a processor,
the memory storing a client program configured to:
    enable a user to identify a file to transfer from a source to a destination,
    send first data packets based on the identified file to the router,
    in response to sending the first data packets, start execution of a checking program in the background to periodically determine whether data within the identified file includes sensitive information and analyze the sensitive information, the destination, and a policy to determine a probability that transmission of the data from the source to the destination would violate the policy, and
    send a second data packet, comprising a header including a field that indicates that the second data packet is to be treated as a stop data packet, to the router upon receiving a notification from the checking program based on the checking program determining the probability exceeds a threshold, the processor configured to execute the client program,
wherein the router forwards the first data packets from the buffer to the destination until the router receives the second data packet, and upon the router receiving the second data packet, the router deletes data stored in the buffer for the identified file.

2. The router system of claim 1, wherein the memory stores a machine learning model, and the client program determines whether the data includes the sensitive information using the machine learning model.

3. The router system of claim 2, wherein the machine learning model is derived from a plurality of textual files that have been annotated to indicate whether each of the textual files include the sensitive information.

4. The router system of claim 2, wherein the client program determines the policy using a machine learning model derived from a plurality of textual files that have been annotated to indicate whether each of the textual files includes a rule against transmitting a particular type of data from a certain source to a certain destination.

5. The router system of claim 2, wherein the router restarts the forwarding of the first data packets to the destination upon receiving a data packet whose header includes the field indicating the start data packet.

6. The router system of claim 1, wherein the client program is an e-mail client.

7. The router system of claim 1, wherein the client program is a file transfer protocol (FTP) client.

8. The router system of claim 1, wherein the client program is configured to control a camera of the computer to capture an image of the user, apply a machine learning model to the captured image to determine an emotion of the user, and increase the probability by a pre-defined increment when the determined emotion is fear or nervousness, where the machine learning model is generated from images of faces labeled to indicate one of a plurality of different emotions.

9. The router system of claim 1, wherein the processor receives physiological sensor data of the user from a physiological sensor and the processor checking program increases the probability by a pre-defined increment when the sensor data indicates a heart rate of the user exceeds a pre-defined rate.

10. The router system of claim 1, wherein the client program provides a notification to a supervisor notifying the supervisor of a stoppage after sending the second data packet, and the client program sends a third packet to the router having a field indicating a start data packet upon receiving a response to the notification from the supervisor informing the system to send the third packet.

* * * * *